United States Patent
Lee et al.

(10) Patent No.: US 11,993,706 B2
(45) Date of Patent: *May 28, 2024

(54) POLYESTER FILM AND PREPARATION METHOD THEREFOR

(71) Applicant: SK CHEMICALS CO., LTD., Gyeonggi-do (KR)

(72) Inventors: Yoo Jin Lee, Gyeonggi-do (KR); Da-Young Hwang, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 217 days.

This patent is subject to a terminal disclaimer.

(21) Appl. No.: 17/422,683

(22) PCT Filed: Jul. 10, 2019

(86) PCT No.: PCT/KR2019/008505
§ 371 (c)(1),
(2) Date: Jul. 13, 2021

(87) PCT Pub. No.: WO2020/149472
PCT Pub. Date: Jul. 23, 2020

(65) Prior Publication Data
US 2022/0119637 A1  Apr. 21, 2022

(30) Foreign Application Priority Data

Jan. 17, 2019 (KR) .......... 10-2019-0006447
Jul. 9, 2019 (KR) .......... 10-2019-0082671

(51) Int. Cl.
| | |
|---|---|
| *C08L 67/02* | (2006.01) |
| *B29C 48/00* | (2019.01) |
| *B29C 48/08* | (2019.01) |
| *B29C 48/21* | (2019.01) |
| *B29C 55/14* | (2006.01) |
| *B32B 27/08* | (2006.01) |
| *B32B 27/36* | (2006.01) |
| *C08J 5/18* | (2006.01) |
| *B29K 67/00* | (2006.01) |
| *B29K 105/00* | (2006.01) |

(52) U.S. Cl.
CPC .......... *C08L 67/02* (2013.01); *B29C 48/0018* (2019.02); *B29C 48/08* (2019.02); *B29C 48/21* (2019.02); *B29C 55/143* (2013.01); *B32B 27/08* (2013.01); *B32B 27/36* (2013.01); *C08J 5/18* (2013.01); *B29K 2067/003* (2013.01); *B29K 2105/0094* (2013.01); *B29K 2995/0012* (2013.01); *B29K 2995/0053* (2013.01); *B32B 2250/244* (2013.01); *B32B 2307/30* (2013.01); *B32B 2307/518* (2013.01); *B32B 2307/732* (2013.01); *C08J 2367/02* (2013.01); *C08J 2467/02* (2013.01); *C08L 2203/16* (2013.01); *C08L 2203/30* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 5,958,581 A | 9/1999 | Khanarian et al. | |
| 6,025,061 A | 2/2000 | Khanarian et al. | |
| 6,063,464 A | 5/2000 | Charbonneau et al. | |
| 9,790,321 B2 | 10/2017 | Kulkarni et al. | |
| 2012/0226014 A1 | 9/2012 | Lee et al. | |
| 2015/0148515 A1 | 5/2015 | Kim et al. | |
| 2015/0197598 A1 | 7/2015 | Kim et al. | |
| 2016/0168321 A1 | 6/2016 | Kulkarni et al. | |
| 2016/0222157 A1 | 8/2016 | Lee et al. | |
| 2019/0160728 A1* | 5/2019 | Higashioji | G02B 1/04 |
| 2020/0148816 A1 | 5/2020 | Lee et al. | |
| 2020/0172662 A1 | 6/2020 | Lee et al. | |
| 2022/0380595 A1 | 12/2022 | Lee et al. | |

FOREIGN PATENT DOCUMENTS

| | | |
|---|---|---|
| CN | 1298343 | 6/2001 |
| CN | 1298418 | 6/2001 |
| CN | 102498150 | 6/2012 |
| CN | 102666681 | 9/2012 |
| CN | 104334607 | 2/2015 |
| CN | 104334608 | 2/2015 |
| CN | 105392816 | 3/2016 |
| EP | 2573136 | 3/2013 |
| JP | H11-240962 | 9/1999 |
| JP | 2005-200516 | 7/2005 |

(Continued)

OTHER PUBLICATIONS

English Translation of the International Search Report for International (PCT) Patent Application No. PCT/KR2019/008505, dated Oct. 30, 2019, 2 pages.
International Search Report and Written Opinion for International (PCT) Patent Application No. PCT/KR2019/008505, dated Oct. 30, 2019, 9 pages.
Extended Search Report for European Patent Application No. 19909753.6, dated Sep. 2, 2022, 9 pages.
International Search Report and Written Opinion for International (PCT) Patent Application No. PCT/KR2019/008312, dated Oct. 30, 2019, 8 pages.
English Translation of the International Search Report for International (PCT) Patent Application No. PCT/KR2019/008312, dated Oct. 30, 2019, 2 pages.

(Continued)

*Primary Examiner* — Sheeba Ahmed
(74) *Attorney, Agent, or Firm* — Sheridan Ross P.C.

(57) ABSTRACT

The present disclosure relates to a polyester film and a preparation method of the same. Since the polyester film includes a resin layer formed from a polyester resin including a first diol moiety derived from isosorbide and a second diol moiety derived from cyclohexanedimethanol in a controlled ratio on at least one surface of a base layer, it is possible to exhibit excellent heat resistance and adhesion.

16 Claims, No Drawings

(56) References Cited

FOREIGN PATENT DOCUMENTS

| | | |
|---|---|---|
| JP | 2012-126821 | 7/2012 |
| JP | 2016-022667 | 2/2016 |
| KR | 10-0545285 | 1/2006 |
| KR | 10-2009-0073373 | 7/2009 |
| KR | 10-2016-0012158 | 2/2016 |
| KR | 10-2019-0001551 | 1/2019 |
| TW | 201116577 | 5/2011 |
| TW | 201434637 | 9/2014 |
| WO | WO 2014/100258 | 6/2014 |
| WO | WO 2014/100260 | 6/2014 |
| WO | WO 2018/236111 | 12/2018 |
| WO | WO 2019/004679 | 1/2019 |

OTHER PUBLICATIONS

Extended Search Report for European Patent Application No. 19910782.2, dated Sep. 14, 2022, 8 pages.
Official Action for U.S. Appl. No. 17/422,699, dated Sep. 20, 2023 6 pages Restriction Requirement.

\* cited by examiner

POLYESTER FILM AND PREPARATION METHOD THEREFOR

CROSS-REFERENCE TO RELATED APPLICATION(S)

This application is a national stage application under 35 U.S.C. 371 and claims the benefit of PCT Application No. PCT/KR2019/008505 having an international filing date of 10 Jul. 2019, which designated the United States, which PCT application claimed the benefits, of Korean Patent Applications No. 10-2019-0006447 filed on Jan. 17, 2019 and No. 10-2019-0082671 filed on Jul. 9, 2019 with the Korean Intellectual Property Office, the entire disclosures of each of which are incorporated herein by reference in their entireties. The present disclosure relates to a polyester film and a preparation method of the same.

BACKGROUND ART

PET (polyethylene terephthalate), which is a representative example of a polyester resin, has been widely used as a material for optical films, electrical insulating films, packaging films, laminate films, and various protective films due to its low price and excellent mechanical/chemical/electrical properties. However, PET has poor heat resistance. Thus, a method of increasing heat resistance by a heat setting process at a high temperature is used to prepare a film using PET. However, when the PET film thus prepared is exposed to a high temperature for a long time, there is a problem that oligomers are precipitated on the surface of the film to crystallize, and as a result, transparency of the film is deteriorated. In order to prevent this, a method of adding a separate process such as coating has been proposed. However, there are problems that the preparation method is complicated, defects occur in post-processing, and contamination easily occurs. Usually, a molding process such as printing is performed on a film at a high temperature of about 80° C. for improving productivity. However, since PET has a low glass transition temperature of 80° C. or lower, the probability of defects is significantly increased when a molding process such as printing is performed at a high temperature. In addition, when PET has low chemical resistance to a solvent used for printing, transparency of the film is deteriorated, and surface defects are likely to occur. Further, PET exhibits high crystallinity, especially in biaxial stretching, and thus has a disadvantage in heat sealability. Accordingly, a PET film used for optics is required to have high transparency even in a high temperature process by having a low oligomer content. In addition, the PET film for printing is required to have high heat resistance and chemical resistance to exhibit excellent productivity. Particularly, for use in industrial or packaging applications, further studies are required for a polyester film exhibiting excellent adhesion and heat sealability by controlling crystallinity.

DETAILED DESCRIPTION OF THE INVENTION

Technical Problem

The present disclosure is to provide a polyester film exhibiting excellent heat resistance and adhesion.

The present disclosure is also to provide a preparation method of the above polyester film.

Technical Solution

According to an embodiment of the present disclosure, there is provided a polyester film including: a base layer comprising a thermoplastic resin; and a resin layer located on at least one surface of the base layer, and formed from a polyester resin that has a structure in which an acid moiety derived from a dicarboxylic acid or a derivative thereof and a diol moiety derived from a diol are repeated and is characterized in that a content of a first diol moiety (a) derived from isosorbide and a content of a second diol moiety (b) derived from cyclohexanedimethanol with respect to 100 mol % of a total diol moiety derived from the diol satisfy the following Equation 1, wherein the polyester film is stretched in at least one of a longitudinal direction and a transverse direction, and when a thickness of the polyester film is 200 μm, tan delta calculated according to the following Equation 2 is 100° C. or more, and strain at 100° C. calculated according to the following Equation 3 is 3% or less.

$$b \leq 18 \,\text{mol}\, \% - a \qquad \text{[Equation 1]}$$

(In the above Equation 1, a is a content (mol %) of a first diol moiety derived from isosorbide and is 4 to 18 mol % with respect to 100 mol % of a total diol moiety derived from the diol in the polyester resin, and b is a content (mol %) of a second diol moiety derived from cyclohexanedimethanol.)

$$\text{Tan delta} = E'/E'' \qquad \text{[Equation 2]}$$

(In the above Equation 2, E' and E" are Young's modulus and loss modulus, respectively, measured using dynamic mechanical analysis under a fixed frequency and a temperature condition where the temperature increases at a rate of 3° C./min from room temperature up to 150° C.)

$$\begin{aligned}\text{Strain}\,(\%) = &\,[(\text{length of polyester film after stress application} \\ &\text{at } 100°\text{C.} - \text{length of polyester film} \\ &\text{before stress application})/\text{length of} \\ &\text{polyester film before stress application}] \times 100\end{aligned} \qquad \text{[Equation 3]}$$

(In the above Equation 3, the length of polyester film after stress application and the length of polyester film before stress application are a length of the film deformed by a stress of 10 MPa applied at 100° C. under an isothermal condition for 10 minutes after increasing a temperature of the polyester film from room temperature according to a Creep TTS test and a length of the film before applying the stress, respectively.)

According to another embodiment of the present disclosure, there is provided a preparation method of the above polyester film.

Advantageous Effects

The polyester film of the present disclosure may exhibit excellent heat resistance and adhesion. Accordingly, the polyester film can be used in various applications such as industrial films, food container films, packaging films, optical films, insulating films, printing films, and adhesive films.

DETAILED DESCRIPTION OF THE EMBODIMENTS

Hereinafter, the polyester film and the preparation method thereof according to a specific embodiment of the present invention will be described.

The terminology used herein is for the purpose of describing particular embodiments only and is not intended to be limiting of the invention. The singular forms are intended to include the plural forms as well, unless the context clearly indicates otherwise. The terms "include", "comprise", and the like of the present disclosure are used to specify certain features, regions, integers, steps, operations, elements, and/or components, and do not exclude the existence or the addition of other certain features, regions, integers, steps, operations, elements, and/or components.

In addition, unless otherwise indicated in this disclosure, room temperature (RT) means 20±5° C.

Specifically, the polyester film according to an embodiment of the present disclosure includes:
a base layer comprising a thermoplastic resin; and
a resin layer located on at least one surface of the base layer, and formed from a polyester resin that has a structure in which an acid moiety derived from a dicarboxylic acid or a derivative thereof and a diol moiety derived from a diol are repeated, and is characterized in that a content of a first diol moiety (a) derived from isosorbide and a content of a second diol moiety (b) derived from cyclohexanedimethanol with respect to 100 mol % of a total diol moiety derived from the diol satisfy the following Equation 1,
wherein the polyester film is stretched in at least one of a longitudinal direction and a transverse direction, and when a thickness of the polyester film is 200 μm, tan delta calculated according to the following Equation 2 is 100° C. or more, and strain at 100° C. calculated according to the following Equation 3 is 3% or less.

$$b \leq 18 \, \text{mol} \, \% - a \qquad \text{[Equation 1]}$$

(In the above Equation 1, a is a content (mol %) of a first diol moiety derived from isosorbide and is 4 to 18 mol % with respect to 100 mol % of a total diol moiety derived from the diol in the polyester resin, and b is a content (mol %) of a second diol moiety derived from cyclohexanedimethanol.)

$$\text{Tan delta} = E'/E'' \qquad \text{[Equation 2]}$$

(In the above Equation 2, E' and E'' are Young's modulus and loss modulus, respectively, measured using dynamic mechanical analysis under a fixed frequency and a temperature condition where the temperature increases at a rate of 3° C./min from room temperature up to 150° C.)

Strain (%) = [Equation 3]
[(length of polyester film after stress application at 100° C.−length of polyester film before stress application)/length of polyester film before stress application]×100

(In the above Equation 3, the length of polyester film after stress application and the length of polyester film before stress application are a length of the film deformed by a stress of 10 MPa applied at 100° C. under an isothermal condition for 10 minutes after increasing a temperature of the polyester film from room temperature according to a Creep TTS test and a length of the film before applying the stress, respectively.)

PET (polyethylene terephthalate), which is a representative example of a polyester resin, has low heat resistance, which limits its use. In addition, since the degree of crystallinity is high, adhesion during a heat sealing process may be lowered.

In order to solve these problems, a method of introducing isosorbide into a polymer main chain of an existing polyester resin has been proposed. Residues derived from isosorbide can lower regularity of the polymer chain, thereby reducing a crystallization rate of the resin. In order to ensure sufficient heat resistance and adhesion, the polyester resin should include a large amount of the diol moiety derived from isosorbide. However, the large amount of the diol moiety derived from isosorbide has caused a problem of not being able to function as a crystalline resin. Noncrystalline resins cannot be molded by stretching because of their low regularity of the molecular structure. Therefore, there was a limitation in the content of isosorbide that can be introduced into the polymer main chain of the polyester resin.

With respect to these technical limitations, the present disclosure can greatly improve heat resistance and adhesion of the polyester film to be prepared by placing a resin layer formed from a polyester resin exhibiting excellent heat resistance and adhesion on at least one surface of a base resin made of a thermoplastic resin, followed by stretching, wherein the polyester resin includes a diol moiety (first diol moiety) derived from isosorbide (ISB) and a diol moiety (second diol moiety) derived from cyclohexanedimethanol (CHDM) in a controlled ratio. Accordingly, the polyester film may be useful for food container films or printing films requiring excellent heat resistance, and adhesive films and packaging films requiring high adhesion, by controlling crystallinity.

Specifically, the polyester film according to an embodiment of the present disclosure is a stretched film having a multilayer structure of two or more layers in which a resin layer formed from the polyester resin is located on at least one surface of a base layer.

The resin layer of the polyester film includes a polyester resin exhibiting excellent heat resistance and adhesion by having a structure in which an acid moiety derived from a dicarboxylic acid or a derivative thereof and a diol moiety derived from a diol are repeated, and comprising a first diol moiety derived from isosorbide and a second diol moiety derived from cyclohexanedimethanol with respect to 100 mol % of a total diol moiety derived from the diol in a content satisfying the following Equation 1. Accordingly, the resin layer is located on at least one surface of the base layer, and may compensate for low adhesion and heat resistance of the base layer.

The polyester resin of the resin layer is obtained by a polycondensation reaction after an esterification reaction or a transesterification reaction of a dicarboxylic acid or a derivative thereof, and a diol including isosorbide and optionally cyclohexanedimethanol. Accordingly, the polyester resin has a structure in which an acid moiety derived from a dicarboxylic acid or a derivative thereof and a diol moiety derived from a diol are repeated, and includes 4 to 18 mol % of a diol moiety (first diol moiety) derived from isosorbide with respect to 100 mol % of the total diol moiety and optionally a diol moiety (second diol moiety) derived from cyclohexanedimethanol. When further including the diol moiety derived from cyclohexanedimethanol, it is included in the content such that a total content of the first diol moiety derived from isosorbide and the second diol moiety derived from cyclohexanedimethanol is 18 mol % or less with respect to 100 mol % of the total diol moiety. That is, the polyester resin may include: 4 to 18 mol % of the first diol moiety derived from isosorbide with respect to 100 mol % of the total diol moiety (in this case, the content of a diol moiety derived from cyclohexanedimethanol is 0 mol %); or 4 to 18 mol % of the first diol moiety derived from isosorbide, and more than 0 and 14 mol % or less of the second diol moiety derived from cyclohexanedimethanol, wherein a total content of the first diol moiety and the second diol moiety is 18 mol % or less with respect to 100 mol % of the total diol moiety.

In the present disclosure, the acid moiety and the diol moiety refer to a residue that remains after polymerizing a dicarboxylic acid or a derivative thereof and a diol, and removing hydrogen, a hydroxyl group, or an alkoxy group therefrom.

The first diol moiety derived from isosorbide (1,4:3,6-dianhydroglucitol) is introduced into the polyester resin to lower a crystallization rate. However, when the content is excessive, specifically, when the content exceeds 18 mol % with respect to 100 mol % of the total diol moiety constituting the resin, yellowing may occur, and crystallinity may be significantly reduced to make stretching and heat setting difficult. When the content of the first diol moiety derived from isosorbide is less than 4 mol % with respect to 100 mol % of the total diol moiety, it is difficult to sufficiently improve heat resistance and adhesion. The polyester resin used in the present disclosure includes the diol moiety derived from isosorbide within the content range of 4 mol % or more, 5 mol % to 18 mol %, or 5 mol % to 16 mol % with respect to 100 mol % of the total diol moiety, thereby improving heat resistance and adhesion in the preparation of a film.

In addition, the polyester resin may further include the second diol moiety derived from cyclohexanedimethanol in the content such that a total content of the second diol moiety and the first diol moiety derived from isosorbide is 18 mol % or less with respect to 100 mol % of the total diol moiety.

The second diol moiety derived from cyclohexanedimethanol may be introduced into the polyester resin to improve light transmittance of the polyester resin. However, when the content exceeds a certain level, amorphousness of the polyester resin may be increased, so that stretching orientation may not be possible, and as a result, there is a risk of breakage in a stretching process. Accordingly, the second diol moiety derived from cyclohexanedimethanol may be included in a residual content such that the total content with the first diol moiety is 18 mol % or less with respect to 100 mol % of the total diol moiety, while satisfying the content condition of the first diol moiety. Specifically, the second diol moiety derived from cyclohexanedimethanol may be included in a content of 14 mol % or less, 10 mol % or less, or 5 mol % or less with respect to 100 mol % of the total diol moiety, or may not be included (0 mol %).

Specific examples of the cyclohexanedimethanol may include 1,2-cyclohexanediol, 1,4-cyclohexanediol, 1,2-cyclohexanedimethanol, 1,3-cyclohexanedimethanol, 1,4-cyclohexanedimethanol, and the like. A diol moiety derived from any one or a mixture of two or more thereof may be included in the polyester resin.

The polyester resin may further include 82 to 96 mol %, or 84 to 95 mol %, of a diol moiety derived from a C2 to C12 aliphatic diol (third diol moiety), in addition to the first and second diol moieties derived from isosorbide and with respect to 100 mol % of the total diol moiety. The third diol moiety derived from an aliphatic diol may improve adhesion of the polyester resin and increase crystallinity. However, when the content exceeds 96 mol %, heat resistance and adhesion may be lowered, and when the content is less than 82 mol %, it may be difficult to perform stretching and heat setting due to the increase in amorphousness.

Specific examples of the aliphatic diol may include linear or branched aliphatic diols such as ethylene glycol, diethylene glycol, triethylene glycol, propanediol (1,2-propanediol, 1,3-propanediol, etc.), 1,4-butanediol, pentanediol, hexanediol (1,6-hexanediol, etc.), and neopentyl glycol (2,2-dimethyl-1,3-propanediol), and any one or a mixture of two or more thereof may be used. Among them, a diol moiety derived from ethylene glycol, which can further improve light transmittance and adhesion, may be included as the third diol moiety. According to an embodiment of the present disclosure, a content of a diol moiety derived from diethylene glycol may be 1 mol % or less, more specifically 0 mol %, or more than 0 mol % and 1 mol % or less, with respect to the total diol moiety in the polyester resin. When the content of the diol moiety derived from diethylene glycol is controlled to be within the above range in the polyester resin, heat resistance can be further improved.

In addition to the above-described diol moieties derived from isosorbide, cyclohexanedimethanol, and aliphatic diols (first to third diol moieties), the polyester resin may further include a diol moiety derived from other diols (fourth diol moiety) such as a C7 to C12 alicyclic diol in a residual content.

More specifically, the diol moiety in the polyester resin consists of the first diol moiety derived from isosorbide, the second diol moiety derived from cyclohexanedimethanol, and the third moiety derived from aliphatic diols with respect to 100 mol % of the total diol moiety. Herein, the first diol moiety and the second diol moiety can be included in a content satisfying the Equation 1 above. More specifically, the diol moiety in the polyester resin may consist of 4 to 18 mol % or 5 to 16 mol % of the first diol moiety derived from isosorbide and 82 to 96 mol % or 84 to 85 mol % of the third diol moiety derived from ethylene glycol with respect to 100 mol % of the total diol moiety.

The term "dicarboxylic acid or a derivative thereof" as used herein refers to one or more compounds selected from dicarboxylic acids and derivatives of the dicarboxylic acid. The term "derivative of the dicarboxylic acid" refers to an alkyl ester of the dicarboxylic acid (lower alkyl ester having 1 to 4 carbon atoms such as monomethyl, monoethyl, dimethyl, diethyl, or dibutyl ester) or an anhydride of the dicarboxylic acid. Thus, for example, terephthalic acid or a derivative thereof is commonly called a compound that reacts with a diol to form a terephthaloyl moiety, such as: terephthalic acid; monoalkyl or dialkyl terephthalate; and terephthalic acid anhydride.

In the polyester film according to an embodiment of the present disclosure, the polyester resin includes an acid moiety derived from a dicarboxylic acid or a derivative thereof together with the above-described diol moiety, wherein the dicarboxylic acid or the derivative thereof may be terephthalic acid or a derivative thereof. Specifically, terephthalic acid or a derivative thereof may be used alone as the dicarboxylic acid or the derivative thereof. Further, the dicarboxylic acid or the derivative thereof may be used by mixing the terephthalic acid or the derivative thereof with at least one selected from the group consisting of a C8 to C14 aromatic dicarboxylic acid or a derivative thereof and a C4 to C12 aliphatic dicarboxylic acid or a derivative thereof as the dicarboxylic acid or a derivative thereof other than the terephthalic acid or the derivative thereof. Examples of the C8 to C14 aromatic dicarboxylic acid or the derivative thereof may include aromatic dicarboxylic acids or derivatives thereof that are generally used in the preparation of a polyester resin, for example, a naphthalene dicarboxylic acid such as isophthalic acid, dimethyl isophthalate, phthalic acid, dimethyl phthalate, phthalic acid anhydride, and 2,6-naphthalene dicarboxylic acid, and a dialkylnaphthalene dicarboxylate such as dimethyl 2,6-naphthalene dicarboxylate, diphenyl dicarboxylic acid, and the like. The C4 to C12 aliphatic dicarboxylic acid or the derivative thereof may be a linear, branched, or cyclic aliphatic dicarboxylic acid or a derivative thereof commonly used in the preparation of a polyester resin. Examples thereof may include a cyclohexanedicarboxylic acid such as 1,4-cyclohexane dicarboxylic acid and 1,3-cyclohexane dicarboxylic acid, a cyclohexane dicarboxylate such as dimethyl 1,4-cyclohexane dicarboxylate and dimethyl 1,3-cyclohexane dicarboxylate, sebacic acid, succinic acid, isodecylsuccinic acid, maleic acid, maleic anhydride, fumaric acid, adipic acid, glutaric acid, azelaic acid, and the like.

The dicarboxylic acid or the derivative thereof may preferably be terephthalic acid, dimethyl terephthalate, or a mixture of terephthalic acid and isophthalic acid among the above-described compounds in order to ensure physical properties of the polyester resin thus prepared and to improve the resin film.

The dicarboxylic acid or the derivative thereof may include 40 mol % or more, 50 mol % or more, 60 mol % or more, 70 mol % or more, 80 mol % or more, or 90 mol % or more of the terephthalic acid or the derivative thereof with respect to 100 mol % of a total dicarboxylic acid or a derivative thereof. The dicarboxylic acid or the derivative thereof may include 60 mol % or less, more than 0 mol % and 60 mol % or less, 0.1 to 55 mol %, 0.1 to 20 mol %, or 5 to 10 mol % of another dicarboxylic acid or a derivative thereof other than the terephthalic acid or the derivative thereof with respect to 100 mol % of the total dicarboxylic acid or the derivative thereof, and thus, each acid moiety derived from the compound may be included in the polyester resin in the content corresponding to the above. A polyester resin with proper physical properties may be prepared within this content range.

Since the effect can be remarkably improved by controlling the type and content of the acid moiety and the diol moiety constituting the polyester resin, the acid moiety may consist of only the first acid moiety derived from terephthalic acid or a derivative thereof, or may consist of 40 mol % or more and 100 mol % or less, or 90 to 95 mol % of the first acid moiety derived from terephthalic acid or a derivative thereof, and more than 0 mol % and 60 mol % or less, or 5 to 10 mol % of the second acid moiety derived from a C8 to C14 aromatic dicarboxylic acid or a derivative thereof with respect to 100 mol % of the total acid moiety. The diol moiety may consist of 4 to 18 mol % of the first diol moiety derived from isosorbide, 14 mol % or less of the second diol moiety derived from cyclohexanedimethanol, and 82 to 96 mol % of the third diol moiety derived from aliphatic diols with respect to 100 mol % of the total diol moiety under the conditions satisfying the Equation 1 above.

In addition, the polyester resin may further include at least one or more additives such as a polycondensation catalyst, a stabilizer, a coloring agent, a crystallizing agent, an antioxidant, or a branching agent added during the production process. Specifically, the polyester resin may further include at least one selected from the group consisting of 1 to 300 ppm of a polycondensation catalyst, 10 to 5000 ppm of a phosphorus stabilizer, 1 to 300 ppm of a cobalt-based coloring agent, 1 to 200 ppm of a crystallizing agent, 10 to 500 ppm of an antioxidant, and 10 to 300 ppm of a branching agent, with respect to a total weight of the polyester resin based on a central metal atom. Specific examples and the content thereof will be explained in detail in the preparation method of a polyester resin below.

The polyester resin having the composition as described above may control physical properties to exhibit a more excellent effect when applied to the resin film by controlling the type and content of the monomer, and polymerization conditions. Specifically, the polyester resin may have an intrinsic viscosity of 0.50 to 1.00 dl/g measured at 35° C. after being dissolved in ortho-chlorophenol at a concentration of 1.2 g/dl at 150° C. for 15 minutes.

The intrinsic viscosity (IV) of the polyester resin may affect processability and mechanical strength properties in the preparation of a film. An intrinsic viscosity of less than the above range may result in poor appearance during molding due to fast flow, and may not secure sufficient mechanical strength. Further, it may be difficult to achieve desired physical properties by high stretching. In addition, when the intrinsic viscosity exceeds the above range, a pressure of the extruder is increased due to an increase in viscosity of a molten material during molding, so that a coextrusion process may not be smooth. When a temperature of the extruder is raised to reduce the pressure, color and physical properties may be degraded due to deformation by heat, and process problems may occur due to a difference in shrinkage with a base layer in the stretching and heat treatment processes.

More specifically, the polyester resin may have the intrinsic viscosity (or melt intrinsic viscosity) of 0.45 to 0.65 dl/g, or 0.50 to 0.60 dl/g, wherein the intrinsic viscosity is measured at 35° C. after dissolving a polymer obtained immediately after the esterification reaction or the transesterification reaction and the polycondensation reaction in ortho-chlorophenol at a concentration of 1.2 g/dl at 150° C. for 15 minutes. In addition, after the esterification reaction or the transesterification reaction and the polycondensation reaction, the intrinsic viscosity can be further increased through an additional crystallization process and a solid-phase polymerization reaction. The polymer obtained after the solid-phase polymerization reaction is dissolved in ortho-chlorophenol at a concentration of 1.2 g/dl at 150° C. for 15 minutes to measure intrinsic viscosity (or solid-phase intrinsic viscosity) at 35° C. This intrinsic viscosity (or solid-phase intrinsic viscosity) may be 0.10 to 0.40 dl/g, or 0.15 to 0.25 dl/g higher than the intrinsic viscosity (or melt intrinsic viscosity) of the polymer after the polycondensation reaction. Specifically, the solid-phase intrinsic viscosity after the crystallization and solid-phase polymerization reaction may be 0.6 to 1.0 dl/g, or 0.65 to 0.95 dl/g. When the solid-phase intrinsic viscosity is within the above range, a molecular weight distribution of the polyester resin is narrowed, thereby lowering a crystallization rate during molding. Accordingly, heat resistance and crystallinity can be improved without reducing transparency.

In the present disclosure, the intrinsic viscosity of the polyester resin can be calculated using Equations 4 and 5 below after measuring the time taken (efflux time; to) for a solvent to pass between certain internal sections of a viscosity tube, and the time taken (t) for a solution prepared by dissolving the polyester resin in the solvent to pass the tube, respectively.

In the polyester film according to an embodiment of the present disclosure, the resin layer may be formed from a resin mixture further comprising polyethylene terephthalate together with the polyester resin.

The polyethylene terephthalate may include polyethylene terephthalate (PET) obtained by polycondensing terephthalic acid and ethylene glycol; or a PET-based copolymer polyester resin in which a part of terephthalic acid is replaced by another dicarboxylic acid or a part of ethylene glycol is replaced by another diol. Specifically, examples of another diol to replace a part of the ethylene glycol may include linear or branched aliphatic diols or alicyclic diols such as diethylene glycol, triethylene glycol, propanediol (1,2-propanediol, 1,3-propanediol, etc.), 1,4-butanediol, pentanediol, hexanediol (1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethyl cyclobutanediol, and the like.

The polyethylene terephthalate is different from the polyester resin described above, and more specifically, may have a structure in which a diol moiety derived from a diol other than isosorbide as another diol is repeated.

The physical properties of the polyethylene terephthalate may affect properties of the polyester resin film. Among various physical properties, a melting point may affect heat resistance of the polyester resin film. The melting point of polyethylene terephthalate can be controlled by controlling the type and content of monomers and polymerization conditions. The polyethylene terephthalate (resin A) may have a melting point of 220 to 260° C., or 225 to 245° C., when measured using differential scanning calorimetry (DSC). By having the melting point within the above temperature range, the polyethylene terephthalate can further improve heat resistance.

When the resin layer is formed from a resin mixture comprising polyethylene terephthalate together with the polyester resin described above, the resin mixture may comprise the polyethylene terephthalate and the polyester resin in a weight ratio of 90:10 to 10:90, or 30:70 to 10:90. By including the polyethylene terephthalate and the polyester resin within the above mixing ratio, heat resistance and adhesion of the resin film can be improved at the same time with good balance. When the content of the polyethylene terephthalate is too high by exceeding the mixing ratio of 90:10 in the resin mixture, an improving effect of adhesion from the polyester resin may be insignificant. When the content of the polyester resin is too high by exceeding the mixing ratio of 10:90, an improving effect from the polyethylene terephthalate may be insignificant.

In addition, the resin layer of the polyester film according to an embodiment of the present disclosure may further include at least one additive selected from the group consisting of a crystallizing agent, a sunscreen agent, an antistatic agent, an impact modifier, an antioxidant, and fine particles. The method of adding the additive is not particularly limited. For example, it may be added in the preparation of a polyester resin, or may be added by manufacturing a high concentration masterbatch of an additive, and diluting and mixing it.

For example, the resin layer may further include 5 to 200 ppm, or 100 to 200 ppm of a crystallizing agent with respect to a total weight of the polyester resin. Examples of the crystallizing agent may include a crystal nucleating agent, an ultraviolet absorber, a polyolefin-based resin, a polyamide resin, and the like, and any one or a mixture of two or more thereof may be used. By further including the crystallizing agent within the above range, heat resistance may be further improved.

Meanwhile, the base layer of the polyester film according to an embodiment of the present disclosure includes a thermoplastic resin.

The thermoplastic resin may be: polyethylene terephthalate (PET) obtained by polycondensing terephthalic acid and ethylene glycol; or a PET-based copolymer polyester resin in which a part of terephthalic acid is replaced by another dicarboxylic acid or a part of ethylene glycol is replaced by another diol. The PET-based copolymer polyester resin is different from the polyester resin, and examples of another diol to replace a part of the ethylene glycol may include diols other than isosorbide, more specifically neopentyl glycol, 1,4-cyclohexanedimethanol, propylene glycol, tetramethylene glycol, and the like.

The polyethylene terephthalate is different from a polyester resin (resin B) described later, and more specifically, may have a structure in which a diol moiety derived from a diol other than isosorbide as another diol is repeated.

The polyester film according to an embodiment of the present disclosure may include one or more of the resin layers and the base layers, respectively. Specifically, the polyester film may have a structure in which: the resin layer is laminated on both surfaces of the base layer; the resin layer is interposed between two or more base layers; or the resin layers are disposed between two or more base layers and on the surface of the base layer. Among these, when it has a multilayer structure of three or more layers, the resin layer exhibiting excellent heat resistance and adhesion may be located on the surface of the base layer such as a structure of resin layer/base layer/resin layer.

A thickness of the base layer and the resin layer in the polyester film may be appropriately determined according to the physical properties or the use of the polyester film, and heat resistance and adhesion of the film can be further improved by controlling the thickness of the base layer and the resin layer. Specifically, a percentage ratio of a thickness of the resin layer with respect to a thickness of the base layer (=(thickness of resin layer/thickness of base layer)×100) may be 5 to 75%, 10 to 70%, or 20 to 60%. When the polyester film includes one or more of the base layers and resin layers, it is preferable that a percentage ratio of a thickness of the entire resin layers with respect to a thickness of the entire base layers satisfies the above condition. In this case, the thickness of each of the plurality of base layers or resin layers may be the same or different. More specifically, the thickness of the entire polyester film may be 3 to 350 μm, and the thickness of the resin layer may be adjusted so that the percentage ratio of a thickness of the resin layer with respect to a thickness of the polyester film (=(thickness of resin layer/thickness of polyester film)×100) may be 10 to 50% or 20 to 45%.

For example, when the polyester film has a three-layer structure of resin layer/base layer/resin layer, the thickness of the entire polyester film may be 3 to 350 μm, the percentage ratio of a thickness of the entire resin layer with respect to a thickness of the base layer (=(thickness of entire resin layer/thickness of base layer)×100) may be 20 to 50%, or 20 to 45%, and the percentage ratio of a thickness of the entire resin layer with respect to a thickness of the polyester film (=(thickness of entire resin layer/thickness of polyester film)×100) may be 20 to 45%, or 20 to 40%. In addition, each resin layer may have the same thickness as each other while satisfying the above percentage ratio.

In the present disclosure, the thickness of the film, the resin layer, and the base layer can be measured using an optical microscope, and it means an average thickness, unless otherwise indicated.

The polyester film having the above structure is a stretched film stretched in at least one of a longitudinal direction and a transverse direction, specifically at a total stretch ratio of 2 to 15 times, or 4 to 12 times.

More specifically, the polyester film may be a stretched film uniaxially stretched in any one of the longitudinal direction and the transverse direction, and a stretch ratio in a longitudinal direction or in a transverse direction may be 2 to 15 times, 4 to 12 times, or 5 to 10 times.

In addition, the polyester film may be a stretched film that is biaxially stretched in the longitudinal direction and the transverse direction, and a stretch ratio in the longitudinal direction may be 2 to 5 times, 2 to 4 times, or 2 to 3 times, and a stretch ratio in the transverse direction may be 2 to 7 times, 2 to 6 times, or 2 to 5 times. When stretched at the above stretch ratio, heat resistance may be further improved.

Moreover, when the polyester film is the stretched film biaxially stretched in the longitudinal direction and the transverse direction, the stretch ratio in the longitudinal direction and the stretch ratio in the transverse direction may be the same or different. In addition, in the case of a biaxially stretched film in which the stretch ratios are different, the stretch ratio in the longitudinal direction may be smaller than the stretch ratio in the transverse direction, and the stretch ratios in the longitudinal direction and the transverse direction may satisfy the stretch ratio range described above, respectively.

The polyester film according to the embodiment of the present disclosure may be prepared by a preparation method including the steps of:
(a1) performing melt extrusion of a resin composition for forming a base layer comprising a thermoplastic resin and a composition for forming a resin layer comprising a polyester resin simultaneously or sequentially to prepare an unstretched polyester film in which the base layer formed from the thermoplastic resin and the resin layer formed from the polyester resin on at least one surface of the base layer are laminated; and
(a2) stretching the unstretched polyester film in at least one of a longitudinal direction and a transverse direction at a higher temperature than or equal to a glass transition temperature of the polyester resin. That is, according to another embodiment of the present disclosure, there is provided a preparation method of the above polyester film.

In the step (a1), the thermoplastic resin and the polyester resin are the same as described above. The composition for forming the resin layer may further include polyethylene terephthalate in addition to the polyester resin, and may optionally include at least one additive selected from the group consisting of a crystallizing agent, a sunscreen agent, an antistatic agent, an impact modifier, an antioxidant, and fine particles for improving physical properties and effect of the polyester film to be prepared. The polyethylene terephthalate, nucleating agent, and other additives are as described above.

The melt extrusion in the step (a1) may be carried out at a temperature of 240 to 310° C., or 250 to 300° C. When the temperature is less than 240° C., the polymer may not be melted. When it exceeds 310° C., it may be difficult to achieve desired physical properties, because thermal decomposition of the polymer increases and the film is damaged or broken during stretching of the film. Accordingly, the melt extrusion process may be performed at a relatively low temperature as in the above range, thereby minimizing the thermal decomposition of the polymer to maintain a long chain structure.

As a result of the melt extrusion process, a sheet-shaped melt extrudate, which is an unstretched polyester film in which the base layer formed from the thermoplastic resin and the resin layer formed from the polyester resin on at least one surface of the base layer are laminated, can be prepared. The unstretched polyester film prepared in the step (a1) may optionally be subjected to a cooling process to an appropriate temperature, and the cooling process may be carried out according to a conventional method.

Subsequently, in the step (a2), a process of stretching the unstretched polyester film obtained in the step (a1) at a higher temperature than or equal to a glass transition temperature of the polyester resin is performed.

Specifically, the stretching process may be performed at a temperature of 80 to 180° C., or 90 to 170° C. in at least one of a longitudinal direction and a transverse direction.

Specifically, the stretching process may be performed in at least one of a longitudinal direction and a transverse direction at a total stretch ratio of 2 to 15 times, 4 to 12 times, or 5 to 10 times. More specifically, a stretch ratio in the longitudinal direction may be 2 to 5 times, 2 to 4 times, or 2 to 3 times, and a stretch ratio in the transverse direction may be 2 to 7 times, 2 to 6 times, or 2 to 5 times. When stretched at the above stretch ratio, heat resistance may be further improved.

In addition, the preparation method of the polyester film according to an embodiment of the present disclosure may further include a step (a3) of heat setting the polyester film obtained in the step (a2) after the step (a2).

The heat setting process in the step (a3) may be performed according to a conventional heat setting method except for a temperature of 100 to 220° C. By performing the heat setting process within the above temperature range, it is possible to reduce strain by increasing crystallinity of the resin film to be prepared, and mechanical strength properties may be improved.

Meanwhile, the polyester resin used in the step (a1) is a polyester resin in which isosorbide is introduced in the above-described content.

In order to prepare the polyester resin, the preparation method of the polyester film may further include, before the step (a1): a step of preparing the polyester resin by a method including (a0-1) performing an esterification reaction or a transesterification reaction on a dicarboxylic acid or a derivative thereof, and a diol including isosorbide and optionally cyclohexanedimethanol; and (a0-2) performing a polycondensation reaction on a product obtained by the esterification or transesterification reaction to prepare a polyester resin having an intrinsic viscosity of 0.45 dl/g to 0.65 dl/g at 35° C. after being dissolved in ortho-chlorophenol at a concentration of 1.2 g/dl at 150° C. for 15 minutes.

The polyester resin may be prepared in a batch, semi-continuous, or continuous manner, and the esterification reaction or the transesterification reaction of (a0-1) and the polycondensation reaction of (a0-2) may be carried out under an inert gas atmosphere.

In the preparation of the polyester resin, the isosorbide is used in the content such that a first diol moiety derived from isosorbide is 4 to 18 mol % with respect to 100 mol % of the total diol moiety of the prepared polyester resin. However, since some of the isosorbide may be volatilized or may not react during the synthesis of the polyester resin, the isosorbide may be used in a content of 1 to 35 mol, or 5 to 30 mol, with respect to 100 mol of the total dicarboxylic acid or the derivative thereof in order to introduce the isosorbide in the above-described content into the polyester resin. When the content of isosorbide exceeds the above range, yellowing may occur and crystallinity may be markedly reduced, which may be disadvantageous for the stretching and heat setting process. When the content is less than the above range, it may not exhibit sufficient heat resistance and adhesion, resulting in haze. However, a polyester film having excellent heat resistance, adhesion, and transparency may be provided by controlling the content of isosorbide within the above range.

In addition, when the polyester resin further includes a second diol moiety derived from cyclohexanedimethanol, the cyclohexanedimethanol may be added in the content such that the second diol moiety satisfies the condition of Equation 1 above.

In addition, the content of a diol moiety derived from an aliphatic diol introduced into the polyester resin is not directly proportional to the content of the aliphatic diol used for the preparation of the polyester resin. However, the aliphatic diol may be used in a content of 90 to 120 mol, or 95 to 115 mol with respect to 100 mol of the total dicarboxylic acid or the derivative thereof in order for the polyester resin to include 82 to 96 mol % of the third diol moiety derived from the aliphatic diol with respect to 100 mol % of the total diol moiety constituting the polyester resin.

As described above, the polyester resin may include a fourth diol moiety derived from an alicyclic diol in a residual content, in addition to the first diol moiety derived from isosorbide, the second diol moiety derived from cyclohexanedimethanol, and the third diol moiety derived from an aliphatic diol. The alicyclic diol may be added in the content such that the fourth diol moiety derived from an alicyclic diol is more than 0 and 10 mol % or less, or 0.1 to 5 mol % with respect to 100 mol % of the total diol moiety.

In the esterification reaction or transesterification reaction of (a0-1) for preparing the polyester resin, the dicarboxylic acid, or the derivative thereof and the diol react in a stoichiometric ratio, a molar ratio, of 1:1. However, the dicarboxylic acid or the derivative thereof and the diol may be added to the reactor in the content such that a molar ratio of the diol to 1 mol of the dicarboxylic acid or the derivative thereof (molar ratio of the diol/the dicarboxylic acid or the derivative thereof) is 1.01 or more.

For example, when a dicarboxylic acid is used as the dicarboxylic acid or the derivative thereof, an initial mixing molar ratio of the diol to the dicarboxylic acid may be adjusted to 1:1.01 to 1.5, or 1:1.05 to 1.3. When using a derivative such as a dicarboxylic acid alkyl ester or a dicarboxylic acid anhydride as the dicarboxylic acid or the derivative thereof, the initial mixing molar ratio of the diol to the derivative of dicarboxylic acid may be adjusted to 1:2.0 to 1:2.5, or 1:2.1 to 1:2.3.

In addition, the diol may be added to the reactor at one time before the polymerization reaction, or added during the polymerization reaction several times. According to a more specific embodiment, it is possible to prepare a polyester resin that satisfies a specific molecular weight distribution by adjusting the initial content of the dicarboxylic acid or the derivative thereof and the diol to a specific range at the initial stage of the reaction. Accordingly, it is possible to more effectively provide the polyester film of the embodiment and the polyester resin included therein. This initial mixing molar ratio may refer to a mixing molar ratio at the initiation of the polymerization reaction in the reactor, and the dicarboxylic acid or the derivative thereof and/or the diol may be further added during the reaction, if necessary.

In addition, the esterification or transesterification reaction of (a0-1) for the preparation of the polyester resin may be carried out in a batch, semi-continuous, or continuous manner. Each raw material may be added separately, but it may preferably be added in a slurry form in which the dicarboxylic acid or the derivative thereof is mixed in the diol.

Further, a catalyst may be used in the esterification or transesterification reaction of (a0-1). Such catalyst may include: methylates of sodium and magnesium; acetates, borates, fatty acids, carbonates, or alkoxy salts of Zn, Cd, Mn, Co, Ca, Ba, Ti, and the like; metals such as Mg; and oxides of Pb, Zn, Sb, Ge, and the like, and $GeO_2$, $Sb_2O_3$, or a mixture of $Sb_2O_3$ and Mn (II) acetate tetrahydrate may preferably be used. The catalyst may be used in a molar ratio of 1 to 3, or 1.05 to 2.5, with respect to 1 mol of the dicarboxylic acid or a derivative thereof.

In addition, at least one additive of a polycondensation catalyst, a stabilizer, a coloring agent, a crystallizing agent, an antioxidant, and a branching agent may be further added in the slurry before the esterification or transesterification reaction of (a0-1) or in the product after completion of the reaction. However, the present disclosure is not limited thereto, and the above-described additive may be added at any time during the preparation of the polyester resin.

As the polycondensation catalyst, at least one of conventional titanium, germanium, antimony, aluminum, and tin-based compounds may be appropriately selected and used. Examples of the preferable titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, a titanium dioxide/silicon dioxide copolymer, a titanium dioxide/zirconium dioxide copolymer, and the like. In addition, examples of the preferable germanium-based catalyst include germanium dioxide and a copolymer thereof. An added content of the polycondensation catalyst may be 1 to 300 ppm with respect to a total weight of the final polymer (polyester resin) based on a central metal atom.

As the stabilizer, phosphorus-based compounds such as phosphoric acid, trimethyl phosphate, and triethyl phosphate may be generally used, and an added content thereof may be 10 to 5000 ppm with respect to a weight of the final polymer (polyester resin) based on a phosphorus atom. When the content of the stabilizer is less than 10 ppm, the polyester resin may not be sufficiently stabilized and a color of the polyester resin may become yellow. When the content is more than 5000 ppm, a polymer having a high degree of polymerization may not be obtained.

Further, examples of the coloring agent to be added for improving a color of the polymer may include conventional cobalt-based coloring agents such as cobalt acetate, cobalt propionate, and the like. An added content thereof may be 1 to 300 ppm with respect to a weight of the final polymer (polyester resin) based on a cobalt atom. If necessary, anthraquinone-based compounds, perinone-based compounds, azo-based compounds, methine-based compounds, and the like may be used as an organic coloring agent, and commercially available products include toners such as Polysynthren Blue RLS (manufactured by Clarient) and Solvaperm Red BB (manufactured by Clarient). An added content of the organic coloring agent may be more than 0 ppm and 50 ppm or less with respect to a total weight of the final polymer (polyester resin). When the coloring agent is used in the content out of the above-described range, a yellow color of the polyester resin may not be sufficiently covered or physical properties may be reduced.

Examples of the crystallizing agent may include a crystal nucleating agent (silica, talc, aluminum hydroxide, boron nitride, etc.), an ultraviolet absorber (benzotriazole, benzophenone, salicylate, cyanoacrylate, oxanilide, a hindered amine light stabilizer (HALS), etc.), a polyolefin-based resin (polyethylene, polypropylene, etc.), a polyamide resin, and the like, and any one or a mixture of two or more thereof may be used. An added content thereof may be 1 to 200 ppm, 5 to 200 ppm, or 100 to 200 ppm with respect to a total weight of the final polymer (polyester resin).

Examples of the antioxidant may include a hindered phenolic antioxidant, a phosphite-based antioxidant, a thioether-based antioxidant, and a mixture thereof, and an added content thereof may be 10 to 500 ppm with respect to a total weight of the final polymer (polyester resin).

Examples of the branching agent may include a conventional branching agent having three or more functional groups such as trimellitic anhydride, trimethylol propane, trimellitic acid, and a mixture thereof, and an added content thereof may be 10 to 300 with respect to a total weight of the final polymer (polyester resin).

Moreover, the esterification or transesterification reaction of (a0-1) for preparing the polyester resin may be carried out at a temperature of 150 to 300° C. or 200 to 270° C., and under a pressure of 0 to 10.0 kgf/cm$^2$ (0 to 7355.6 mmHg), 0 to 5.0 kgf/cm$^2$ (0 to 3677.8 mmHg), or 0.1 to 3.0 kgf/cm$^2$ (73.6 to 2206.7 mmHg). The pressures outside the parentheses refer to gauge pressures (expressed in kgf/cm$^2$), and the pressures inside parentheses refer to absolute pressures (expressed in mmHg). When the reaction temperature and pressure are out of the above range, physical properties of the polyester resin may be lowered. The reaction time (average residence time) is usually 1 to 24 hours, or 2 to 8 hours, and may vary depending on the reaction temperature, pressure, and molar ratio of the diol to the dicarboxylic acid or the derivative thereof used.

The product obtained by the esterification or transesterification reaction of (a0-1) may be subjected to the following polycondensation reaction of (a0-2) to prepare a polyester resin having a high degree of polymerization.

The polycondensation reaction of (a0-2) may be carried out at a temperature of 150 to 300° C., 200 to 290° C., or 250 to 290° C., and under a reduced pressure of 0.01 to 400 mmHg, 0.05 to 100 mmHg, or 0.1 to 10 mmHg. Herein, the pressures refer to absolute pressures. The reduced pressure of 0.01 to 400 mmHg is for removing by-products of the polycondensation reaction such as glycol and unreacted materials such as isosorbide. Therefore, when the pressure is out of the above range, the removal of by-products and unreacted materials may be insufficient. In addition, when the temperature of the polycondensation reaction is out of the above range, physical properties of the polyester resin may be lowered. The polycondensation reaction may be carried out for a required time until the desired intrinsic viscosity is reached, for example, for an average residence time of 1 to 24 hours.

In order to reduce the content of the unreacted materials such as isosorbide remaining in the polyester resin, the unreacted raw materials may be discharged out of the system by intentionally maintaining the vacuum reaction for a long period of time at the end of the esterification reaction or the transesterification reaction or at the beginning of the polycondensation reaction, that is, in a state in which the viscosity of the resin is not sufficiently high. When the viscosity of the resin is high, it is difficult for the raw materials remaining in the reactor to flow out of the system. For example, the unreacted materials remaining in the polyester resin such as isosorbide may be removed effectively by leaving the reaction products obtained by the esterification or transesterification reaction before the polycondensation reaction for about 0.2 to 3 hours under a reduced pressure of about 400 to 1 mmHg or about 200 to 3 mmHg. Herein, a temperature of the product may be controlled to be equal to that of the esterification or transesterification reaction or that of the polycondensation reaction, or a temperature therebetween.

By adding the process of flowing out the unreacted raw materials out of the system through the control of the vacuum reaction, it is possible to reduce the content of unreacted materials such as isosorbide remaining in the polyester resin. As a result, it is possible to more effectively obtain a polyester film and a polyester resin included therein satisfying the physical properties of the embodiment.

Meanwhile, a melt intrinsic viscosity of the polymer obtained after the polycondensation reaction of (a0-2) may preferably be 0.45 dl/g to 0.65 dl/g. When the intrinsic viscosity is less than 0.45 dl/g, a reaction rate of the solid-phase polymerization reaction may be significantly lowered. When the intrinsic viscosity exceeds 0.65 dl/g, a viscosity of a molten material may be increased during the melt polymerization, and thus a possibility of polymer discoloration may be increased by shear stress between a stirrer and the reactor, resulting in by-products such as acetaldehyde.

Herein, the melt intrinsic viscosity of the polymer is measured at 35° C. after being dissolved in ortho-chlorophenol at a concentration of 1.2 g/dl at 150° C. for 15 minutes.

Through the steps (a0-1) and (a0-2) as described above, the polyester resin for forming a polyester film according to an embodiment of the present disclosure may be prepared.

After completion of the polycondensation reaction, the obtained polymer may be further subjected to a solid-phase polymerization reaction after crystallization to prepare a polyester resin having a uniform molecular weight distribution, and as a result, transparency in the preparation of a film may be further improved.

Accordingly, the preparation method of the polyester film according to an embodiment of the present disclosure may include, after the polycondensation reaction step of (a0-2): (a0-3) performing crystallization on the polyester resin (hereinafter referred to as polymer) obtained by the polycondensation reaction (melt polymerization); and (a0-4) performing solid-phase polymerization on the crystallized polymer so as to have an intrinsic viscosity, which is measured at 35° C. after being dissolved in ortho-chlorophenol at a concentration of 1.2 g/dl at 150° C. for 15 minutes, of 0.10 to 0.40 dl/g higher than that of the polymer obtained in the step (a0-2).

Specifically, in the crystallization step of (a0-3), the polymer obtained by the polycondensation reaction of (a0-2) is discharged out of the reactor to perform granulation. The granulation may be performed by a strand cutting method in which the polymer is extruded into a strand shape, solidified in a cooling liquid, and cut with a cutter, or an underwater cutting method in which a die hole is immersed in a cooling liquid, the polymer is directly extruded into the cooling liquid and cut with a cutter. In general, a temperature of the cooling liquid should be kept low in the strand cutting method to solidify the strand well, so that there is no problem in cutting. In the underwater cutting method, it is preferable to maintain the temperature of the cooling liquid in accordance with the polymer to make the shape of the polymer uniform. However, in the case of a crystalline polymer, the temperature of the cooling liquid may be intentionally kept high in order to induce crystallization during the discharge.

Meanwhile, it is also possible to perform water-washing on the granulated polymer. A temperature of water during the water-washing is preferably equal to the glass transition temperature of the polymer or lower than that by about 5 to 20° C., and when the temperature of water is higher than the above-described range, it is not preferred since fusion may occur. In the case of the particles of the polymer in which the crystallization is induced during the discharge, the fusion may not occur even at a higher temperature than the glass transition temperature, so that the water temperature may be determined according to a degree of crystallization. By water-washing the granulated polymer, it is possible to remove the raw materials that are dissolved in water among the unreacted raw materials. The smaller the particle size, the wider the surface area relative to a weight of particles. Accordingly, it is advantageous for a particle size to be small. In order to achieve this purpose, the particles may be made to have an average weight of about 14 mg or less.

The granulated polymer is subjected to a crystallization step to prevent fusion during the solid-phase polymerization reaction. The crystallization step may be performed in an ambient atmosphere, an inert gas atmosphere, a water vapor atmosphere, a water vapor-containing inert gas atmosphere, or in solution, and may be performed at 110 to 180° C. or 120 to 180° C. When the temperature is low, a rate at which crystals of the particles are formed may be excessively slow. When the temperature is high, a rate at which a surface of the particles is melted may be faster than a rate at which the crystals are formed, so that the particles may adhere to each other to cause fusion. Since the heat resistance of the particles is increased as the particles are crystallized, it is also possible to crystallize the particles by dividing the crystallization into several steps and raising the temperature stepwise.

The solid-phase polymerization reaction may be performed under an inert gas atmosphere such as nitrogen, carbon dioxide, argon, and the like, or under a reduced pressure of 400 to 0.01 mmHg and at a temperature of 180 to 220° C. for an average residence time of 1 hour or more, preferably 10 hours or more. By performing the solid-phase polymerization reaction, the molecular weight may be additionally increased, and the raw materials that do not react in the melting reaction but just remain, and a cyclic oligomer, acetaldehyde, and the like that are generated during the reaction, may be removed.

The solid-phase polymerization reaction may be performed until the solid-phase intrinsic viscosity of the polymer reaches a value of 0.10 to 0.40 dl/g higher than the melt intrinsic viscosity of the polymer obtained in the polycondensation reaction of (a0-2). When the difference between the solid-phase intrinsic viscosity of the polymer after the solid-phase polymerization reaction and the melt intrinsic viscosity of the polymer before the solid-phase polymerization reaction is less than 0.10 dl/g, a degree of polymerization may not be sufficiently improved. When the difference exceeds 0.40 dl/g, a molecular weight distribution becomes wider, so that sufficient heat resistance may not be exhibited. In addition, a content of oligomer is relatively increased, so that it is highly likely to crystallize at a high temperature, thereby making it difficult to maintain high transparency after heat treatment.

More specifically, the solid-phase polymerization reaction may be performed until the solid-phase intrinsic viscosity of the polymer reaches a value of 0.10 to 0.40 dl/g higher than the melt intrinsic viscosity of the polymer before the solid-phase polymerization reaction, which is 0.65 to 1.5 dl/g, 0.7 to 1.2 dl/g, or 0.8 to 1.0 dl/g. When the solid-phase polymerization reaction is performed until the intrinsic viscosity reaches the above range, the molecular weight distribution of the polymer may be narrowed, thereby lowering a crystallization rate during molding. Accordingly, heat resistance and crystallinity may be improved without reducing transparency. When the solid-phase intrinsic viscosity of the polymer after the solid-phase polymerization reaction is less than the above range, it is difficult to provide a polyester film having excellent transparency due to an increase in the crystallization rate by the low molecular weight polymer.

The polyester resin prepared according to the above-described method has a structure in which an acid moiety derived from a dicarboxylic acid or a derivative thereof and a diol moiety derived from a diol are repeated, and includes 4 to 18 mol % of the first diol moiety derived from isosorbide and 0 to 14 mol % of the second diol moiety derived from cyclohexanedimethanol with respect to 100 mol % of the total diol moiety, wherein a total content of the first diol moiety and the second diol moiety is 18 mol % or less with respect to 100 mol % of the total diol moiety. Accordingly, the polyester resin may exhibit excellent heat resistance and adhesion when applied to a film preparation.

The polyester film according to an embodiment of the present disclosure prepared by the above-described preparation method may exhibit excellent heat resistance and adhesion by including the resin layer formed from the above-described polyester resin.

Specifically, the polyester film may have tan delta of 100° C. or more, or 110 to 130° C. when a thickness thereof is 200 μm, wherein the tan delta is calculated by the following the Equation 2. As a result, it can be easily used in a printing process applied at a temperature of about 0° C. and at a higher temperature.

$$\text{Tan delta} = E' / E'' \qquad \text{[Equation 2]}$$

(In the above Equation 2, E' and E" are Young's modulus (or storage modulus) and loss modulus, respectively, measured using dynamic mechanical analysis under a fixed frequency and a temperature condition where the temperature increases at a rate of 3° C./min from room temperature up to 150° C.)

Usually, the heat resistance can be evaluated from the glass transition temperature measured using differential scanning calorimetry (DSC). However, if DSC is not available due to the nature of a sample, E' and E" are measured using dynamic mechanical analysis (DMA) or thermomechanical analysis (TMA), and then the tan delta is calculated from them to obtain the glass transition temperature. Accordingly, in the present disclosure, the tan delta is calculated using DMA, and heat resistance is evaluated based on this. Specifically, the polyester film is cut into a size of 30 mm×5.3 mm (longitudinal length×transverse length) to prepare a specimen, and E' and E" are measured under the following conditions using DMA, respectively. Thereafter, the tan delta can be calculated according to the Equation 2 above.

<Measuring Conditions>

Frequency fixed (Frequency sweep/Amplitude: 15 μm)

Temperature change: temperature increases at a rate of 3° C./min from room temperature (RT) up to 150° C.

If the tan delta calculated by the Equation 2 is 100° C. or more, or more specifically 110° C. or more, it may be determined as 'excellent heat resistance'.

In addition, the polyester film may exhibit low strain due to excellent heat resistance. Specifically, when the polyester film has a thickness of 200 μm, the strain at 100° C. calculated by the following Equation 3 may be 3% or less, or 1 to 3%.

In the present disclosure, the strain (%) can be calculated by a Creep TTS test using dynamic mechanical analysis (DMA) and time-temperature superposition (TTS). Specifically, in the Creep TTS test, the polyester film or a specimen thereof having a size of 30 mm×5.3 mm (longitudinal length×transverse length) is heated up from room temperature (RT), and when the temperature reaches 100° C., a stress of 10 MPa is applied to the polyester film under an isothermal condition for 10 minutes. Thereafter, the length of the polyester film deformed due to the stress applied at 100° C. relative to the length of the polyester film before stress application is converted into strain (%) according to the following Equation 3.

Strain (%) = [Equation 3]

[(length of polyester film after stress application at 100° C.−length of polyester film before stress application)/length of polyester film before stress application]×100

Heat resistance was evaluated based on the strain value at 100° C. When the strain at 100° C. exceeds 3%, the degree of deformation can be visually identified. Accordingly, the strain at 100° C. of 3% or less can be evaluated as 'excellent heat resistance'.

In addition, the polyester film may exhibit excellent adhesion, and in particular, may exhibit excellent adhesion to paper.

As described above, the polyester film according to an embodiment of the present disclosure may be applied in various fields due to its excellent heat resistance and adhesion. In particular, the polyester film may be useful for food container films or printing films requiring excellent heat resistance, and adhesive films or packaging films requiring high adhesion and heat sealability.

Hereinafter, action and effects of the present invention are described by specific examples of the present invention in more detail. However, these examples are provided by way of example, and therefore, should not be construed as limiting the scope of the present invention.

The following physical properties were measured according to the following methods.

(1) Intrinsic Viscosity (IV)

After dissolving a sample in ortho-chlorophenol (o-chlorophenol) at a concentration of 1.2 g/dl at 150° C. for 15 minutes, the intrinsic viscosity of the sample was measured using an Ubbelohde viscosity tube. Specifically, a temperature of the viscosity tube was maintained at 35° C., and the time taken (efflux time; $t_0$) for a solvent (ortho-chlorophenol) to pass between certain internal sections of the viscosity tube and the time taken (t) for a solution prepared by dissolving the sample in the solvent to pass the tube were measured. Subsequently, a specific viscosity ($\eta sp$) was calculated by substituting $t_0$ and t into Equation 4, and the intrinsic viscosity ([$\eta$]) was calculated by substituting the calculated specific viscosity into Equation 5.

$$\eta_{sp} = \frac{t - t_0}{t_0} \quad \text{[Equation 4]}$$

$$[\eta] = \frac{\sqrt{1 + 4A\eta_{sp}} - 1}{2Ac} \quad \text{[Equation 5]}$$

In Equation 5, A is a Huggins constant of 0.247, and c is a concentration of 1.2 g/dl.

In the case of a melt intrinsic viscosity, the polymer obtained after the polycondensation reaction was used as a sample, and in the case of a solid-phase intrinsic viscosity, the polymer obtained after the crystallization and the solid-phase polymerization reaction was used as a sample.

(2) Contents of Diol Moieties Derived from Isosorbide (ISB) and 1,4-Cyclohexanedimethanol (CHDM)

The content of a first diol moiety derived from isosorbide (ISB) and the content of a second diol moiety derived from 1,4-cyclohexanedimethanol (CHDM) were confirmed by a 1H-NMR spectrum obtained at 25° C. using a nuclear magnetic resonance apparatus (JEOL, 600 MHz FT-NMR) after a sample of the finally prepared polyester resin was dissolved in a deuterated chloroform ($CDCl_3$) solvent at a concentration of 3 mg/mL.

(3) Film Thickness

A cross-section of the polyester film prepared in one of the examples and comparative examples was observed with an optical microscope. After confirming the thickness at various positions, their average value was determined as the film thickness.

(4) Tan Delta

In order to evaluate the heat resistance of the polyester film, the polyester film prepared in one of the examples and comparative examples was cut into a size of 30 mm×5.3 mm (longitudinal length×transverse length) to prepare a specimen, and Young's modulus (E') and loss modulus (E") were measured under the following conditions using DMA, respectively. Thereafter, the tan delta was calculated according to the following Equation 2.

<Measuring Conditions>
Frequency fixed (Frequency sweep/Amplitude: 15 μm)
Temperature change: temperature increased at a rate of 3° C./min from room temperature (RT) up to 150° C.

$$\text{Tan delta} = E'/E'' \quad \text{[Equation 2]}$$

If the tan delta is 100° C. or more, or more specifically 110° C. or more, it may be determined as 'excellent heat resistance'.

(5) Strain

When a stress is applied to a specimen of the polyester film, deformation corresponding to the stress occurs in the specimen, and even if the specimen is subjected to a constant stress, a creep phenomenon in which the specimen gradually deforms over time occurs.

Thus, in order to predict the deformation according to a temperature of the polyester film prepared in one of the examples and comparative examples, a Creep TTS test was performed using dynamic mechanical analysis (DMA) and time-temperature superposition (TTS).

Specifically, in the Creep TTS test, a specimen having a size of 30 mm×5.3 mm (longitudinal length×transverse length) of the polyester film prepared in one of the examples and comparative examples was heated up from room temperature (RT), and when the temperature reached 90° C., 100° C., and 110° C., a stress of 10 MPa was applied to the specimen of the polyester film under an isothermal condition for 10 minutes, respectively. Thereafter, the length of the specimen deformed due to the stress applied at 90° C., 100° C., or 110° C. relative to the length of the specimen before the stress application was converted into strain (%) according to Equation 6 below.

$$\text{Strain (\%)} = \quad \text{[Equation 6]}$$
$$[(\text{length of specimen of polyester film after stress application at } 90° \text{ C., } 100° \text{ C.,}$$
$$\text{or } 110° \text{ C.} - \text{length of specimen of polyester film before stress application})/\text{length of specimen of polyester film before stress application}] \times 100$$

For example, the strain at 100° C. can be calculated by substituting the length of the specimen of the polyester film deformed by the stress of 10 MPa applied at 100° C. under an isothermal condition for 10 minutes into the 'length of specimen of polyester film after stress application at 100° C.' in Equation 6 (see Equation 3 above).

As a result of confirming the deformation according to the temperature of 90° C., 100° C., and 110° C., the strain was smaller at 90° C. than 100° C., and higher at 110° C. than 100° C. Thus, heat resistance was evaluated based on the strain value at 100° C. When the strain at 100° C. exceeds 3%, the degree of deformation can be visually identified. Accordingly, the strain at 100° C. of 3% or less was evaluated as 'excellent heat resistance'.

(6) Adhesion

Using a heat gradient tester, the polyester film prepared in one of the examples and comparative examples was placed between papers, and then bonded at 230° C. for 3 seconds to confirm and evaluate the adhesion with the paper according to the following criteria.

○: Bonded X: Not bonded

Preparation of Polyester Resin

Preparation Example 1

3257.4 g (19.6 mol) of terephthalic acid (TPA), 1180.1 g (19.0 mol) of ethylene glycol (EG), and 229.2 g (1.6 mol) of isosorbide (ISB) were placed in a 10 L reactor to which a column and a condenser capable of being cooled by water were connected, but the contents were adjusted such that a diol moiety derived from ISB introduced into the final polyester resin was 5 mol % with respect to a total diol moiety. 1.0 g of $GeO_2$ (molar ratio of $GeO_2$/TPA=1.05) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 kgf/cm².

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.55 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.70 dl/g.

A content of an acid moiety derived from TPA with respect to a total acid moiety contained in the obtained polyester resin was 100 mol %, and a content of a diol moiety derived from ISB with respect to a total diol moiety was 5 mol %.

Preparation Example 2

3354.8 g (20.2 mol) of terephthalic acid (TPA), 1403.4 g (22.6 mol) of ethylene glycol (EG), and 531.1 g (3.6 mol) of isosorbide (ISB) were placed in a 10 L reactor to which a column and a condenser capable of being cooled by water were connected, but the contents were adjusted such that a diol moiety derived from ISB introduced into the final polyester resin was 10 mol % with respect to a total diol moiety. 1.0 g of $GeO_2$ (molar ratio of $GeO_2$/TPA=1.3) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 270° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.50 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were stored in water at 70° C. for 5 hours, allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours.

Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.75 dl/g.

Preparation Example 3

3110.9 g (18.7 mol) of terephthalic acid (TPA), 1161.9 g (18.7 mol) of ethylene glycol (EG), and 820.8 g (5.6 mol) of isosorbide (ISB) were placed in a 10 L reactor to which a column and a condenser capable of being cooled by water were connected, but the contents were adjusted such that a diol moiety derived from ISB introduced into the final polyester resin was 16 mol % with respect to a total diol moiety. 1.0 g of $GeO_2$ (molar ratio of $GeO_2$/TPA=1.3) as a catalyst, 1.46 g of phosphoric acid as a stabilizer, 0.015 g of blue toner (Polysynthren™ Blue RLS, manufactured by Clarient), 0.004 g of red toner (Solvaperm™ Red BB, manufactured by Clarient), 1 ppm of polyethylene as a crystallizing agent, 100 ppm of an antioxidant (Iganox™ 1076), and 100 ppm of trimellitic anhydrate as a branching agent were used. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 275° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.60 dl/g. When the intrinsic viscosity of the reaction product reached a desired level, the reaction product was discharged out of the reactor and stranded. This was solidified with a cooling liquid and granulated to have an average weight of about 12 to 14 mg.

Preparation Example 4

3775.4 g (19.5 mol) of dimethyl terephthalate (DMT), 2654.5 g (42.8 mol) of ethylene glycol (EG), and 852.4 g (5.8 mol) of isosorbide (ISB) were placed in a 10 L reactor to which a column and a condenser capable of being cooled by water were connected, but the contents were adjusted such that a diol moiety derived from ISB introduced into the final polyester resin was 10 mol % with respect to a total diol moiety. 1.5 g of Mn (II) acetate tetrahydrate and 1.8 g of $Sb_2O_3$ (molar ratio of (Mn (II) acetate tetrahydrate+$Sb_2O_3$)/DMT=2.5) were used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 240° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 265° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.50 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.75 dl/g.

Preparation Example 5

3226.4 g (19.4 mol) of terephthalic acid (TPA), 169.8 g (1.0 mol) of isophthalic acid (IPA), 1420.7 g (22.9 mol) of ethylene glycol (EG), and 537.7 g (3.7 mol) of isosorbide (ISB) were placed in a 10 L reactor to which a column and a condenser capable of being cooled by water were connected, but the contents were adjusted such that a diol moiety derived from ISB introduced into the final polyester resin was 10 mol % with respect to a total diol moiety. 1.0 g of $GeO_2$ (molar ratio of $GeO_2/(TPA+IPA)=1.3$) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.50 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.75 dl/g.

Comparative Preparation Example 1

3456.2 g (20.8 mol) of terephthalic acid (TPA), 1536.1 g (24.8 mol) of ethylene glycol (EG), and 182.4 g (1.2 mol) of isosorbide (ISB) were placed in a 10 L reactor to which a column and a condenser capable of being cooled by water were connected, but the contents were adjusted such that a diol moiety derived from ISB introduced into the final polyester resin was 3 mol % with respect to a total diol moiety. 1.0 g of $GeO_2$ (molar ratio of $GeO_2/TPA=1.25$) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.55 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.70 dl/g.

Comparative Preparation Example 2

2988.9 g (18.0 mol) of terephthalic acid (TPA), 1228.0 g (19.8 mol) of ethylene glycol (EG), and 777.8 g (5.4 mol) of cyclohexanedimethanol (CHDM) were placed in a 10 L reactor to which a column and a condenser capable of being cooled by water were connected, but the contents were adjusted such that a diol moiety derived from CHDM introduced into the final polyester resin was 30 mol % with respect to a total diol moiety. 0.7 g of $GeO_2$ (molar ratio of $GeO_2/TPA=1.4$) was used as a catalyst, 1.2 g of phosphoric acid was used as a stabilizer, and 0.5 g of cobalt acetate was used as a coloring agent. Then, nitrogen was injected into the reactor to form a pressurized state in which the pressure of the reactor was higher than normal pressure by 2.0 $kgf/cm^2$.

In addition, the temperature of the reactor was raised to 255° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 275° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.80 dl/g. When the intrinsic viscosity of the reaction product reached a desired level, the reaction product was discharged out of the reactor and stranded. This was solidified with a cooling liquid and granulated to have an average weight of about 12 to 14 mg.

Comparative Preparation Example 3

3060.8 g (18.4 mol) of terephthalic acid (TPA), 971.7 g (15.7 mol) of ethylene glycol (EG), and 1076.8 g (7.4 mol) of isosorbide (ISB) were placed in a 10 L reactor to which a column and a condenser capable of being cooled by water were connected, but the contents were adjusted such that a diol moiety derived from ISB introduced into the final polyester resin was 20 mol % with respect to a total diol moiety. 1.0 g of GeO$_2$ (molar ratio of GeO$_2$/TPA=1.25) was used as a catalyst, 1.46 g of phosphoric acid was used as a stabilizer, and 0.017 g of blue toner (Polysynthren™ Blue RLS, manufactured by Clarient) and 0.006 g of red toner (Solvaperm™ Red BB, manufactured by Clarient) were used. Then, nitrogen was injected into the reactor to form a pressurized state in which the pressure of the reactor was higher than normal pressure by 1.0 kgf/cm$^2$.

In addition, the temperature of the reactor was raised to 265° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.60 dl/g. When the intrinsic viscosity of the reaction product reached a desired level, the reaction product was discharged out of the reactor and stranded. This was solidified with a cooling liquid and granulated to have an average weight of about 12 to 14 mg.

Comparative Preparation Example 4

3156.2 g (19.0 mol) of terephthalic acid (TPA), 730.9 g (11.8 mol) of ethylene glycol (EG), 684.5 g (4.8 mol) of cyclohexanedimethanol (CHDM), and 499.7 g (3.4 mol) of isosorbide (ISB) were placed in a 10 L reactor to which a column and a condenser capable of being cooled by water were connected, but the contents were adjusted such that a diol moiety derived from ISB and a diol moiety derived from CHDM introduced into the final polyester resin were 10 mol % and 25 mol %, respectively, with respect to a total diol moiety. 1.0 g of GeO$_2$ (molar ratio of Ge$_2$/TPA=1.05) was used as a catalyst, 1.46 g of phosphoric acid was used as a stabilizer, and 0.9 g of cobalt acetate was used as a coloring agent. Then, nitrogen was injected into the reactor to form a pressurized state in which the pressure of the reactor was higher than normal pressure by 1.0 kgf/cm$^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 270° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.70 dl/g. When the intrinsic viscosity of the reaction product reached a desired level, the reaction product was discharged out of the reactor and stranded. This was solidified with a cooling liquid and granulated to have an average weight of about 12 to 14 mg.

The intrinsic viscosity (IV) and the contents of diol moieties derived from ISB and CHDM were measured for the polyester resins prepared in preparation examples and comparative preparation examples, respectively. The results are shown in Table 1 below.

TABLE 1

| | Preparation Example | | | | | Comparative Preparation Example | | | |
|---|---|---|---|---|---|---|---|---|---|
| | 1 | 2 | 3 | 4 | 5 | 1 | 2 | 3 | 4 |
| Melt IV[1] (dl/g) | 0.55 | 0.50 | 0.60 | 0.50 | 0.50 | 0.55 | 0.80 | 0.60 | 0.70 |
| Solid-phase IV[2] (dl/g) | 0.70 | 0.75 | ND | 0.75 | 0.75 | 0.70 | ND | ND | ND |
| ISB content[3] (mol %) | 5 | 10 | 16 | 10 | 10 | 3 | 0 | 20 | 10 |
| CHDM content[4] (mol %) | 0 | 0 | 0 | 0 | 0 | 0 | 30 | 0 | 25 |

The term "ND" in Table 1 above means that the solid-phase intrinsic viscosity (solid-phase IV) was not measured since the crystallization and the solid-phase polymerization reaction were not performed after the polycondensation reaction in the preparation of the polyester resin.

In Table 1 above, the intrinsic viscosity (IV) and the contents of diol moieties are as follow:
1) Melt IV: an intrinsic viscosity of the reaction product obtained after the polycondensation reaction in the preparation of the polyester resin.
2) Solid-phase IV: an intrinsic viscosity of the reaction product obtained by the crystallization and solid-phase polymerization reaction after the polycondensation reaction in the preparation of the polyester resin.
3) ISB content: a molar ratio of a diol moiety derived from isosorbide (ISB) with respect to 100 mol % of a total diol moiety derived from the total diol contained in the final polyester resin.
4) CHDM content: a molar ratio of a diol moiety derived from cyclohexanedimethanol (CHDM) with respect to 100 mol % of a total diol moiety derived from the total diol contained in the final polyester resin.

Preparation of Polyester Film

Example 1

Polyethylene terephthalate (SKYPET™ 8050 Grade, manufactured by SK chemicals) for forming a base layer and the polyester resin prepared in Preparation Example 1 for forming a resin layer were added to a multilayer extruder, and melted at a temperature of 250 to 300° C.

Then, the polyethylene terephthalate and the polyester resin were coextruded through a multilayer die, and an unstretched polyester sheet in which the resin layer (B) formed from the polyester resin was formed on upper and lower surfaces of the base layer (A) formed from the polyethylene terephthalate was prepared.

Subsequently, the unstretched polyester sheet was stretched in a longitudinal direction at a stretch ratio of 1 time and in a transverse direction at a stretch ratio of 5 times, followed by heat setting at 100 to 220° C. This was wound up to obtain a polyester film having a three-layer structure of resin layer/base layer/resin layer with a thickness of 200 μm.

Examples 2 to 4

A polyester film having a three-layer structure of resin layer/base layer/resin layer (B/A/B) with a thickness of 200 μm was prepared in the same manner as in Example 1, except that each resin was blended and the stretching was performed as shown in Table 2 below.

Example 5

A polyester film having a three-layer structure of resin layer/base layer/resin layer with a thickness of 200 μm was prepared in the same manner as in Example 1, except that a resin mixture prepared by mixing polyethylene terephthalate (PET, melting point of 255° C.) and the polyester resin prepared in Preparation Example 2 in a weight ratio of 20:80 was used instead of the polyester resin prepared in Preparation Example 1 in the preparation of the resin layer, and the stretching was performed as shown in Table 2 below.

Example 6

A polyester film having a three-layer structure of resin layer/base layer/resin layer with a thickness of 200 μm was prepared in the same manner as in Example 1, except that a mixture of the polyester resin prepared in Preparation Example 2 and polyethylene (prepared in the form of a master batch (m/B) and used at 100 ppm with respect to a total weight of the polyester resin) was used instead of the polyester resin prepared in Preparation Example 1 in the preparation of the resin layer, and the stretching was performed as shown in Table 2 below.

Examples 7 to 8

A polyester film having a three-layer structure of resin layer/base layer/resin layer with a thickness of 200 μm was prepared in the same manner as in Example 1, except that each resin was blended and the stretching was performed as shown in Table 2 below.

Comparative Example 1

Only 100 parts by weight of polyethylene terephthalate (SKYPET™ BL8050 Grade, manufactured by SK Chemicals) was added to an extruder, and melted at a temperature of 250 to 300° C.

Then, the polyester resin was extruded through a die and an unstretched polyester sheet was produced. Subsequently, the unstretched polyester sheet was stretched in a longitudinal direction at a stretch ratio of 1 time and in a transverse direction at a stretch ratio of 1 time, followed by heat setting. This was wound up to obtain a polyester film having a single layer structure with a thickness of 200 μm.

Comparative Examples 2 to 4 and 6 to 8

A polyester film having a three-layer structure of resin layer/base layer/resin layer with a thickness of 200 μm was prepared in the same manner as in Example 1, except that each resin was blended and the stretching was performed as shown in Table 3 below.

Comparative Example 5

A polyester film having a single layer structure with a thickness of 200 μm was prepared in the same manner as in Comparative Example 1, except that the unstretched polyester sheet was stretched in a longitudinal direction at a stretch ratio of 2 times and in a transverse direction at a stretch ratio of 3 times.

Comparative Examples 9 to 11

A polyester film having a three-layer structure of resin layer/base layer/resin layer with a thickness of 200 μm was prepared in the same manner as in Example 1, except that each resin was blended and the stretching was performed as shown in Table 3 below.

TABLE 2

| Example No. | | 1 | 2 | 3 | 4 | 5 | 6 | 7 | 8 |
|---|---|---|---|---|---|---|---|---|---|
| Base layer (A) | | PET | PET | PET | PET | PET | PET | PET | PET |
| Resin layer (B) | | Prep. Ex. 1 | Prep. Ex. 2 | Prep. Ex. 2 | Prep. Ex. 3 | Prep. Ex. 2 + PET | Prep. Ex. 2 + crystallizing agent | Prep. Ex. 4 | Prep. Ex. 5 |
| Thickness ratio of layers (B/A/B) | | 1:8:1 | 1:8:1 | 1.5:7:1.5 | 1:8:1 | 1:8:1 | 1:8:1 | 1:8:1 | 1:8:1 |
| Stretching process | Stretch ratio in MD | 1 | 2 | 3 | 2 | 2 | 2 | 3 | 2 |
| | Stretch ratio in TD | 5 | 2 | 4 | 3 | 3 | 2 | 3 | 5 |
| | Total stretch ratio | 5 | 4 | 12 | 6 | 6 | 4 | 9 | 10 |

TABLE 3

| Comparative Example No. | | 1 | 2 | 3 | 4 | 5 | 6 | 7* | 8* | 9 | 10 | 11 |
|---|---|---|---|---|---|---|---|---|---|---|---|---|
| Base layer (A) | | PET | PET | PET | PET | PET | PET | PET | PET | PET | PET | PET |
| Resin layer (B) | | — | PET Comp. Prep. Ex. 1 | PET Comp. Prep. Ex. 2 | PET Comp. Prep. Ex. 3 | PET | PET Comp. Prep. Ex. 1 | PET Comp. Prep. Ex. 4 | PET Comp. Prep. Ex. 2 | PET Prep. Ex. 1 | PET Prep. Ex. 2 | PET Prep. Ex. 3 |
| Thickness ratio of layers (B/A/B) | | — | 1:8:1 | 1:8:1 | 1:8:1 | — | 1:8:1 | 1:8:1 | 1:8:1 | 1.5:7:1.5 | 1:8:1 | 1:8:1 |
| Stretching process | Stretch ratio in MD | 1 | 1 | 1 | 1 | 2 | 3 | 3 | 3 | 1 | 1 | 1 |
| | Stretch ratio in TD | 1 | 1 | 1 | 1 | 3 | 4 | 4 | 4 | 1 | 1 | 1 |
| | Total stretch ratio | 1 | 1 | 1 | 1 | 6 | 12 | 12 | 12 | 1 | 1 | 1 |

In the case of Comparative Examples 7 and 8 of Table 3 above, the stretching process was attempted at a stretch ratio described above, but a breakage occurred during stretching, since amorphousness was increased due to the second diol moiety derived from CHDM included in a high content in the polyester resin.

Experimental Example: Evaluation of Physical Properties of Polyester Stretched Film The physical properties of the polyester resins prepared in Examples 1 to 8 and Comparative Examples 1 to 11 were evaluated according to the methods described above, and the results are shown in Tables 4 and 5. However, Comparative Examples 7 and 8 were unable to be evaluated in terms of the physical properties, since the stretched film was not prepared.

TABLE 4

| Example No. | 1 | 2 | 3 | 4 | 5 | 6 | 7 | 8 |
|---|---|---|---|---|---|---|---|---|
| Tan delta (° C.) | 115 | 120 | 122 | 125 | 122 | 123 | 120 | 120 |
| Strain (%) | 2 | 2 | 1 | 2.5 | 2.5 | 2.5 | 2 | 2 |
| Adhesion | ○ | ○ | ○ | ○ | ○ | ○ | ○ | ○ |

TABLE 5

| Comparative Example No. | 1 | 2 | 3 | 4 | 5 | 6 | 7 | 8 | 9 | 10 | 11 |
|---|---|---|---|---|---|---|---|---|---|---|---|
| Tan delta (° C.) | 85 | 86 | 85 | 100 | 100 | 108 | N.D. | N.D. | 87/90 | 87/92 | 87/103 |
| Strain (%) | 2 | 2 | 10 | 15 | 2 | 2 | N.D. | N.D. | 2 | 3 | 3 |
| Adhesion | X | X | ○ | ○ | X | X | N.D. | N.D. | ○ | ○ | ○ |

In Table 5, the term "N.D." means that the measurement was impossible.

In Comparative Examples 9 to 11, two tan delta values were confirmed as heat resistance of each layer was exhibited in the unstretched state.

From the above experimental results, it can be confirmed that the polyester films of the examples and comparative examples showed a difference in physical properties depending on the type of resin at the same thickness. It can also be confirmed that the polyester stretched films of Examples 1 to 8 including the resin layer formed from the polyester resin exhibited excellent heat resistance and adhesion as compared with the comparative examples, wherein the polyester resin included the first diol moiety derived from ISB in a content of 4 to 18 mol % and the second diol moiety derived from CHDM in a content satisfying the condition of Equation 1 above with respect to 100 mol % of the total diol moiety derived from the diol in the polyester resin.

Specifically, it can be confirmed from the results of Examples 1 to 8 and Comparative Examples 5 and 6, and Comparative Examples 1 to 4 and 9 to 11, that stretched polyester films exhibited significantly improved heat resistance as compared with unstretched polyester films. In addition, it can be confirmed from the results of Example 1, and Examples 2 to 8, that biaxial stretching can further improve heat resistance as compared with uniaxial stretching. From these results, it can be seen that the heat resistance can be further improved by stretching the film.

Moreover, the polyester resin film of Comparative Example 1 having a single layer structure of an unstretched polyester sheet exhibited significantly reduced heat resistance compared with the examples and comparative examples further including a resin layer on upper and lower surfaces of the film, and no adhesion to paper. Although the stretched polyester resin film of Comparative Example 5, which is obtained by further stretching the film of Comparative Example 1, had increased heat resistance compared with the unstretched film of Comparative Example 1, it still showed no adhesion to paper. It can be confirmed from the results of Comparative Examples 1 to 2 and the examples that heat resistance and adhesion of the single layer film of polyethylene terephthalate could be improved together by forming the resin layer of the polyester resin in which the content of ISB is controlled on the upper and lower surfaces of the base layer of polyethylene terephthalate.

In addition, it can be confirmed from the results of Comparative Examples 2 and 6 in which the content of the first diol moiety derived from ISB was 3 mol % in the polyester resin of the resin layer that no adhesion was observed regardless of stretching. Referring to the results of Comparative Examples 4 and 9 to 11, as the content of the first diol moiety derived from ISB in the resin layer increased, heat resistance and adhesion increased. When the content of the first diol moiety derived from ISB was 20 mol %, it can be seen that strain was greatly increased. From these results, it can be seen that the adhesion and heat resistance can be simultaneously improved when the first diol moiety derived from ISB was included in the polyester resin in an optimum content.

Comparative Example 3, which further included the resin layer on upper and lower surfaces of the film but did not include the first diol moiety derived from ISB in the polyester resin of the resin layer, exhibited adhesion to paper, but had low heat resistance and greatly increased strain. In the case of Comparative Example 7, which included the same content of the first diol moiety derived from ISB as in Examples 2, 3, and 5 to 8 but the higher content of the second diol moiety derived from CHDM in the polyester resin of the resin layer, and Comparative Example 8, which did not include the first diol moiety derived from ISB but included the second diol moiety derived from CHDM at about 30 mol %, the stretching process was impossible due to the increased amorphousness.

From these results, it can be seen that the content of the second diol moiety derived from CHDM as well as the content of the first diol moiety derived from ISB in the polyester resin of the resin layer should be controlled in order to improve heat resistance and adhesion in the present disclosure.

The polyester stretched film according to the embodiment of the present disclosure including the resin layer of the polyester resin in which the content of the first diol moiety derived from ISB and the content of the second diol moiety derived from CHDM are controlled on at least one surface of the base layer exhibited heat resistance with excellent adhesion, and is expected to be useful in various applications such as industrial films, food container films, packaging films, optical films, insulating films, printing films, and adhesive films.

The invention claimed is:

1. A polyester film comprising: a base layer comprising a thermoplastic resin; and
a resin layer located on at least one surface of the base layer, and formed from a polyester resin that has a structure in which an acid moiety derived from a dicarboxylic acid or a derivative thereof and a diol moiety derived from a diol are repeated and is characterized in that a content of a first diol moiety (a) derived from isosorbide and a content of a second diol moiety (b) derived from cyclohexanedimethanol with respect to 100 mol % of a total diol moiety derived from the diol satisfy the following Equation 1,
wherein the polyester film is stretched in at least one of a longitudinal direction and a transverse direction, and when a thickness of the polyester film is 200 μm, Tan delta calculated according to the following Equation 2 is 100° C. or more, and Strain at 100° C. calculated according to the following Equation 3 is 3% or less:

$$b \leq 18\,\text{mol}\,\% - a \quad \text{[Equation 1]}$$

in the above Equation 1, a is a content (mol %) of a first diol moiety derived from isosorbide and is 4 to 18 mol % with respect to 100 mol % of a total diol moiety derived from the diol in the polyester resin, and b is a content (mol %) of a second diol moiety derived from cyclohexanedimethanol, $$\text{Tan delta} = E'/E'' \quad \text{[Equation 2]}$$

in the above Equation 2, E' and E" are Young's modulus and loss modulus, respectively, measured using dynamic mechanical analysis under a fixed frequency and a temperature condition where the temperature increases at a rate of 3° C./min from room temperature up to 150° C., $$\begin{aligned}\text{Strain (\%)} = &\ [(\text{length of polyester film after stress application}\\ &\ \text{at } 100°\text{C.} - \text{length of polyester film}\\ &\ \text{before stress application})/\text{length of}\\ &\ \text{polyester film before stress application}] \times 100\end{aligned} \quad \text{[Equation 3]}$$

in the above Equation 3, the length of polyester film after stress application and the length of polyester film before stress application are a length of the film deformed by a stress of 10 MPa applied at 100° C. under an isothermal condition for 10 minutes after increasing a temperature of the polyester film from room temperature according to a Creep TTS test and a length of the film before applying the stress, respectively.

2. The polyester film of claim 1, wherein the dicarboxylic acid or the derivative thereof comprises terephthalic acid or a derivative thereof.

3. The polyester film of claim 2, wherein the dicarboxylic acid or the derivative thereof comprises 60 mol % or less of a C8 to C14 aromatic dicarboxylic acid or a derivative thereof, or a C4 to C12 aliphatic dicarboxylic acid or a derivative thereof, as a dicarboxylic acid or a derivative thereof other than the terephthalic acid or the derivative thereof, with respect to 100 mol % of a total dicarboxylic acid or a derivative thereof.

4. The polyester film of claim 1, wherein the diol moiety further comprises 82 to 96 mol % of a third diol moiety derived from a C2 to C12 aliphatic diol with respect to 100 mol % of the total diol moiety.

5. The polyester film of claim 4, wherein the diol moiety consists of 4 to 18 mol % of the first diol moiety derived from isosorbide and 82 to 96 mol % of the third diol moiety derived from ethylene glycol as the aliphatic diol with respect to 100 mol % of the total diol moiety.

6. The polyester film of claim 1, wherein the polyester resin further comprises at least one selected from the group consisting of 1 to 300 ppm of a polycondensation catalyst, 10 to 5000 ppm of a phosphorus stabilizer, 1 to 300 ppm of a cobalt-based coloring agent, 1 to 200 ppm of a crystallizing agent, 10 to 500 ppm of an antioxidant, and 10 to 300 ppm of a branching agent, based on a central metal atom.

7. The polyester film of claim 1, wherein the polyester resin has an intrinsic viscosity of 0.50 to 1.00 dl/g as measured at 35° C. after being dissolved in ortho-chlorophenol at a concentration of 1.2 g/dl at 150° C. for 15 minutes.

8. The polyester film of claim 1, wherein the resin layer is formed from a resin mixture further comprising polyethylene terephthalate together with the polyester resin, the resin mixture comprises the polyester resin and the polyethylene terephthalate in a weight ratio of 90:10 to 10:90, and the polyethylene terephthalate is different from the polyester resin.

9. The polyester film of claim 8, wherein the polyethylene terephthalate has a melting point of 220 to 260° C.

10. The polyester film of claim 1, wherein the resin layer further comprises 5 to 200 ppm of a crystallizing agent with respect to a total weight of the polyester resin.

11. The polyester film of claim 1, wherein the thermoplastic resin is polyethylene terephthalate.

12. The polyester film of claim 1, wherein the polyester film is a stretched film stretched in at least one of a longitudinal direction and a transverse direction at a total stretch ratio of 2 to 15 times.

13. The polyester film of claim 1, wherein the polyester film is a stretched film that is biaxially stretched in a longitudinal direction at a stretch ratio of 2 to 5 times and in a transverse direction at a stretch ratio of 2 to 7 times.

14. The polyester film of claim 1, wherein the polyester film comprises one or more of the base layers and resin layers, respectively.

15. The polyester film of claim 1, wherein a ratio of a thickness of the resin layer with respect to 100% of a thickness of the base layer is 5 to 75%.

16. The polyester film of claim 1, wherein the polyester film has a three-layer structure, and the resin layer is located on both upper and lower surfaces of the base layer.

* * * * *